(12) United States Patent
Sharifi

(10) Patent No.: US 11,557,301 B2
(45) Date of Patent: *Jan. 17, 2023

(54) HOTWORD-BASED SPEAKER RECOGNITION

(71) Applicant: Google LLC, Mountain View, CA (US)

(72) Inventor: Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 16/556,358

(22) Filed: Aug. 30, 2019

(65) Prior Publication Data

US 2019/0385615 A1    Dec. 19, 2019

Related U.S. Application Data

(63) Continuation of application No. 15/465,885, filed on Mar. 22, 2017, now Pat. No. 10,438,591, which is a
(Continued)

(51) Int. Cl.
   *G10L 15/00* (2013.01)
   *G10L 15/26* (2006.01)
   (Continued)

(52) U.S. Cl.
   CPC .............. *G10L 17/00* (2013.01); *G10L 15/22* (2013.01); *G10L 17/24* (2013.01); *G10L 15/30* (2013.01);
   (Continued)

(58) Field of Classification Search
   CPC ... G10L 17/22; G10L 15/22; G10L 2015/223; G10L 17/04; G10L 17/24; G10L 17/005;
   (Continued)

(56) References Cited

U.S. PATENT DOCUMENTS 5,297,194 A    3/1994  Hunt et al.
5,335,313 A    8/1994  Douglas
(Continued)

FOREIGN PATENT DOCUMENTS

WO    2014048855 A1    4/2014

OTHER PUBLICATIONS

Pradeep. Ch, "Text Dependent Speaker Recognition Using MFCC and LBG VQ", 2007, Thesis, Department of Electronics & Communcation Engineering, National Institute of Technology, Rourkela, DD. 1-61.

(Continued)

*Primary Examiner* — Olujimi A Adesanya
(74) *Attorney, Agent, or Firm* — Honigman LLP; Brett A. Krueger; Grant Griffith

(57) ABSTRACT

Systems, methods performed by data processing apparatus and computer storage media encoded with computer programs for receiving an utterance from a user in a multi-user environment, each user having an associated set of available resources, determining that the received utterance includes at least one predetermined word, comparing speaker identification features of the uttered predetermined word with speaker identification features of each of a plurality of previous utterances of the predetermined word, the plurality of previous predetermined word utterances corresponding to different known users in the multi-user environment, attempting to identify the user associated with the uttered predetermined word as matching one of the known users in the multi-user environment, and based on a result of the attempt to identify, selectively providing the user with access to one or more resources associated with a corresponding known user.

20 Claims, 5 Drawing Sheets

Related U.S. Application Data continuation of application No. 15/212,839, filed on Jul. 18, 2016, now abandoned, which is a continuation of application No. 13/664,284, filed on Oct. 30, 2012, now abandoned.

(51) Int. Cl.

| | | |
|---|---|---|
| *G10L 21/00* | (2013.01) | |
| *G10L 25/00* | (2013.01) | |
| *G10L 21/06* | (2013.01) | |
| *G10L 17/00* | (2013.01) | |
| *G10L 17/24* | (2013.01) | |
| *G10L 15/22* | (2006.01) | |
| *G10L 15/08* | (2006.01) | |
| *G10L 15/30* | (2013.01) | |

(52) U.S. Cl.
CPC .. *G10L 2015/088* (2013.01); *G10L 2015/227* (2013.01)

(58) Field of Classification Search
CPC ... G10L 2015/227; G06F 3/167; G06F 21/32; G06F 21/31
See application file for complete search history.

(56) References Cited

U.S. PATENT DOCUMENTS

| | | | |
|---|---|---|---|
| 5,526,465 A | 6/1996 | Carey et al. | |
| 5,845,246 A | 12/1998 | Schalk | |
| 6,070,140 A | 5/2000 | Tran | |
| 6,081,782 A | 6/2000 | Rabin | |
| 6,107,935 A | 8/2000 | Comerford et al. | |
| 6,253,179 B1 | 6/2001 | Beigi et al. | |
| 6,272,463 B1 * | 8/2001 | Lapere | G10L 15/065 704/243 |
| 6,345,252 B1 * | 2/2002 | Beigi | G10L 15/26 704/272 |
| 6,397,186 B1 | 5/2002 | Bush et al. | |
| 6,415,257 B1 | 7/2002 | Junqua et al. | |
| 6,449,496 B1 | 9/2002 | Beith et al. | |
| 6,519,561 B1 | 2/2003 | Farrell et al. | |
| 6,735,562 B1 | 5/2004 | Zhang et al. | |
| 6,839,669 B1 | 1/2005 | Gould et al. | |
| 6,973,426 B1 | 12/2005 | Schier et al. | |
| 7,203,652 B1 | 4/2007 | Heck | |
| 7,415,410 B2 | 8/2008 | Campbell et al. | |
| 7,457,745 B2 | 11/2008 | Kadambe et al. | |
| 7,720,683 B1 | 5/2010 | Vermeulen et al. | |
| 7,791,471 B2 * | 9/2010 | Glynn | G06Q 10/087 340/8.1 |
| 7,933,226 B2 | 4/2011 | Woodruff et al. | |
| 7,949,536 B2 | 5/2011 | Mowatt et al. | |
| 8,005,668 B2 | 8/2011 | Arun | |
| 8,060,366 B1 | 11/2011 | Maganti et al. | |
| 8,116,436 B2 * | 2/2012 | Isenberg | H04M 3/385 379/142.01 |
| 8,140,340 B2 | 3/2012 | Bhogal et al. | |
| 8,249,233 B2 * | 8/2012 | Loupia | H04M 1/57 379/202.01 |
| 8,311,820 B2 | 11/2012 | Ranjan | |
| 8,340,975 B1 | 12/2012 | Rosenberger | |
| 8,345,851 B2 | 1/2013 | Vadlakonda et al. | |
| 8,639,508 B2 | 1/2014 | Zhao et al. | |
| 8,699,944 B2 | 4/2014 | Malamud et al. | |
| 8,700,392 B1 | 4/2014 | Hart et al. | |
| 9,098,467 B1 | 8/2015 | Blanksteen et al. | |
| 9,674,177 B1 | 6/2017 | Nystrom | |
| 2001/0041982 A1 | 11/2001 | Kawasaki et al. | |
| 2002/0002465 A1 | 1/2002 | Maes | |
| 2002/0069063 A1 | 6/2002 | Buchner et al. | |
| 2002/0133343 A1 | 9/2002 | Morii et al. | |
| 2002/0181691 A1 | 12/2002 | Miller et al. | |
| 2002/0193989 A1 | 12/2002 | Geilhufe et al. | |
| 2002/0194003 A1 * | 12/2002 | Mozer | G06F 21/32 704/270.1 |
| 2003/0088414 A1 | 5/2003 | Huang et al. | |
| 2003/0110034 A1 | 6/2003 | Runge et al. | |
| 2003/0171930 A1 * | 9/2003 | Junqua | G07C 9/27 704/275 |
| 2005/0165609 A1 | 7/2005 | Zuberec et al. | |
| 2006/0074658 A1 | 4/2006 | Chadha | |
| 2006/0277043 A1 | 12/2006 | Tomes et al. | |
| 2007/0022467 A1 | 1/2007 | Filbrich | |
| 2007/0047719 A1 | 3/2007 | Dhawan et al. | |
| 2007/0143833 A1 | 6/2007 | Conley | |
| 2007/0219801 A1 | 9/2007 | Sundaram et al. | |
| 2008/0059188 A1 | 3/2008 | Konopka et al. | |
| 2008/0082338 A1 | 4/2008 | O'Neil et al. | |
| 2008/0134317 A1 | 6/2008 | Boss et al. | |
| 2008/0228317 A1 | 9/2008 | Ervin | |
| 2009/0006093 A1 | 1/2009 | Das | |
| 2009/0281809 A1 * | 11/2009 | Reuss | G10L 17/24 704/273 |
| 2011/0275348 A1 | 11/2011 | Clark et al. | |
| 2011/0288859 A1 | 11/2011 | Taylor et al. | |
| 2011/0301943 A1 | 12/2011 | Patch | |
| 2012/0026409 A1 | 2/2012 | Higuchi et al. | |
| 2012/0226981 A1 | 9/2012 | Clavin | |
| 2013/0018659 A1 | 1/2013 | Chi et al. | |
| 2013/0080167 A1 | 3/2013 | Mozer | |
| 2013/0173268 A1 | 7/2013 | Weng et al. | |
| 2015/0106089 A1 * | 4/2015 | Parker | G10L 25/48 704/E15.005 |

OTHER PUBLICATIONS

Office Action issued in U.S. Appl. No. 13/664,284 dated Apr. 12, 2013, 29 pages.

Office Action issued in U.S. Appl. No. 13/664,284 dated Oct. 7, 2013, 35 pages.

Office Action issued in U.S. Appl. No. 13/664,284 dated Feb. 5, 2014, 33 pages.

Office Action issued in U.S. Appl. No. 13/664,284 dated May 22, 2014, 41 pages.

Office Action issued in U.S. Appl. No. 15/212,839 dated Oct. 21, 2016, 24 pages.

* cited by examiner

HOTWORD-BASED SPEAKER RECOGNITION

CROSS-REFERENCE TO RELATED APPLICATION

This patent application is a continuation of, and claims priority under 35 U.S.C. § 120 from, U.S. application Ser. No. 15/465,885, filed on Mar. 22, 2017, which is a continuation of U.S. application Ser. No. 15/212,839, filed on Jul. 18, 2016, which is a continuation of U.S. application Ser. No. 13/664,284, filed on Oct. 30, 2012. The disclosures of these prior applications are considered part of the disclosure of this application and are hereby incorporated by reference in their entireties.

FIELD

This specification generally relates to systems and techniques for recognizing the identity of a speaker based on the speaker's voice, otherwise referred to as voice recognition or speaker recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

In general, one aspect of the subject matter described in this specification may be embodied in systems, methods performed by data processing apparatus and computer storage media encoded with computer programs that include the actions of receiving an utterance from a user in a multi-user environment, each user having an associated set of available resources, determining that the received utterance includes at least one predetermined word, comparing speaker identification features of the uttered predetermined word with speaker identification features of each of a plurality of previous utterances of the predetermined word, the plurality of previous predetermined word utterances corresponding to different known users in the multi-user environment, attempting to identify the user associated with the uttered predetermined word as matching one of the known users in the multi-user environment, and based on a result of the attempt to identify, selectively providing the user with access to one or more resources associated with a corresponding known user.

In general, another aspect of the subject matter described in this specification may be embodied in systems, methods performed by data processing apparatus and computer storage media encoded with computer programs that include the actions of receiving an utterance from a user, determining that the received utterance includes at least one predetermined word, comparing speaker identification features of the uttered predetermined word with speaker identification features of each of a plurality of previous utterances of the predetermined word, the plurality of previous predetermined word utterances corresponding to different known usernames, determining, based on a result of the comparison, that the user associated with the uttered predetermined word fails to correspond to any of the known usernames, prompting the user to make an identification utterance, performing speech recognition on the identification utterance made in response to the prompting to determine a username of the user, and associating the determined username with speaker identification features of the uttered predetermined word.

In general, another aspect of the subject matter described in this specification may be embodied in systems, methods performed by data processing apparatus and computer storage media encoded with computer programs that include the actions of receiving an utterance from a user, determining that the received utterance includes at least one predetermined word and an introduction declaration, comparing speaker identification features of the uttered predetermined word with speaker identification features of each of a plurality of previous utterances of the predetermined word, the plurality of previous predetermined word utterances corresponding to different known usernames, determining, based on a result of the comparison, that the user associated with the uttered predetermined word fails to correspond to any of the known usernames, performing speech recognition on the introduction declaration to determine a username of the user, and associating the determined username with speaker identification features of the uttered predetermined word.

Various implementations may include one or more of the following features. The predetermined at least one word may serve as a dual purpose hotword. One of the hotword's dual purposes may be acting as a trigger for a system to process the received utterance and another of the hotword's dual purposes may be serving as fixed word on which speaker identification is performed.

Comparing speaker identification features of the uttered predetermined word may be performed using nearest neighbor analysis. The speaker identification features may include Mal-Frequency Cepstrum Coefficients ("MFCCs"). Attempting to identify the user may involve determining whether MFCCs of the uttered predetermined word sufficiently match MFCCs of one of the plurality of previous utterances of the predetermined word. A determination of sufficient matching may include a result of the nearest neighbor analysis and a maximum allowed distance.

Selectively providing the user with access to one or more resources associated with the corresponding known user may involve providing access only if a match is successfully made. The actions performed may further involve prompting the user with an identity challenge if the attempt to identify the user is unsuccessful.

The received utterance may include a query component and the actions performed may involve performing speech recognition on the query component of the received utterance to identify an operation to be performed by a computer system that has access to the known user's one or more associated resources, and performing the identified operation using at least in part the known user's one or more associated resources.

The actions performed may further include associating the determined username with a corresponding user account that provides the user access to a plurality of personal resources.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
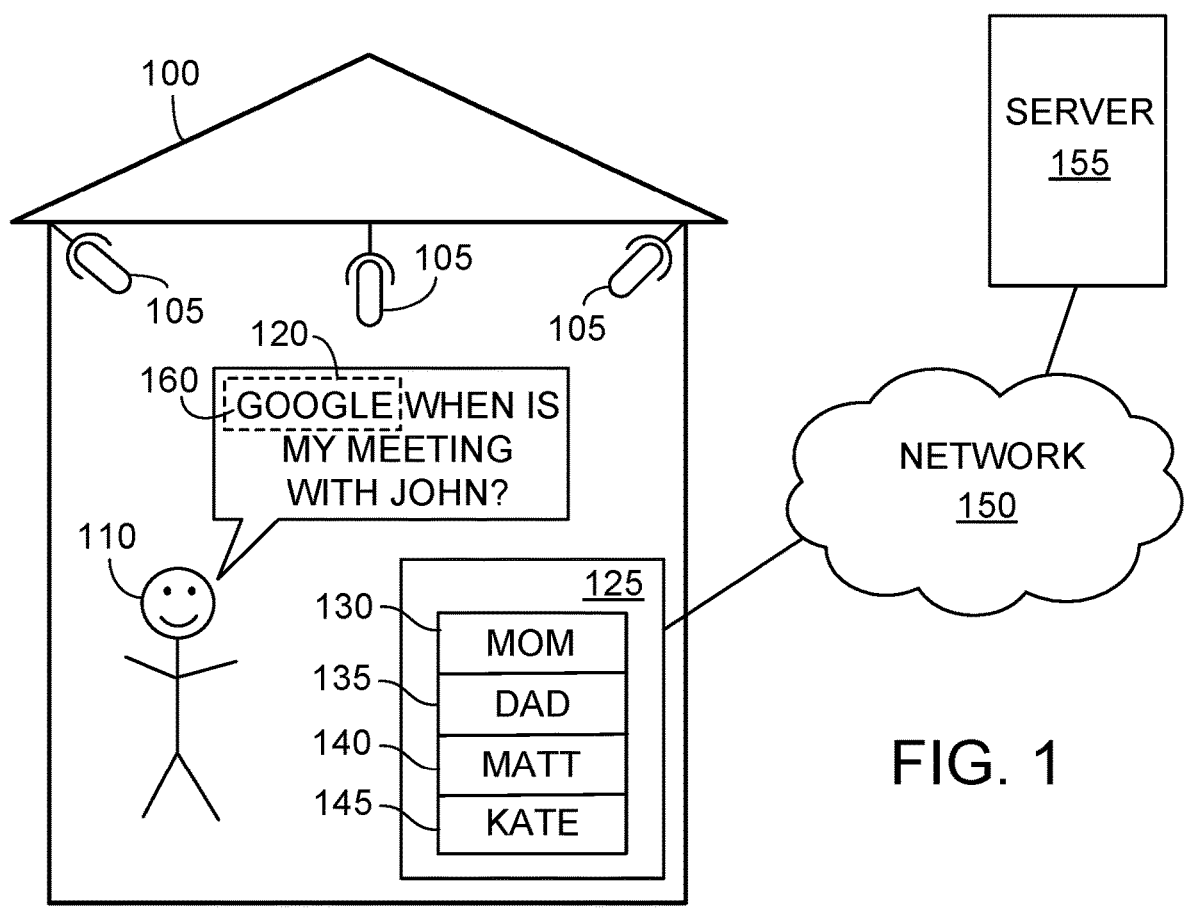
FIG. 1 is a diagram showing an example of a speech-enabled environment.

FIG. 1 is diagram showing an example of a speech-enabled environment 100, which is outfitted with a network of microphones 105 that are strategically arranged throughout the environment 100 such that when a user 110 speaks an utterance 120, at least one of the microphones 105 will pick up the utterance 120. The microphones 105 in turn are connected (wired or wirelessly) to a computer-based system 125, which in this example is local to the environment 100, and which has accounts 130-145 for each of a plurality of different users. As shown in FIG. 1, the system 125 has four user accounts in this example, one for each of four different users, or individuals, that reside at or spend time in the environment. Each user account has an associated username, for example, account 130 is associated with the username "Mom," account 135 is associated with the username "Dad," account 140 is associated with the username "Matt," and account 145 is associated with the username "Kate." Each account is associated with, and provides its respective owner with access to, a collection of personal resources such as the account owner's contact list, calendar, email, voicemail, social networks, biographical information, financial information, applications and the like. Access to such personal resources can be controlled locally by the system 125 or can be distributed, in whole or in part, across one or more server computer systems, such as server 155, via a network 150.

In a speech-enabled environment 100 such as shown in FIG. 1, the users' manner of interacting with the system is designed to be primarily, if not exclusively, by means of voice input. Consequently, the system 125, which potentially picks up all utterances made in the environment 100 including those not directed to the system 125, must have some way of discerning when any given utterance is directed at the system 125 as opposed, e.g., to being directed an individual present in the environment. One way to accomplish this is to use a hotword, which by agreement among the users in the environment 100, is reserved as a predetermined word that is spoken to invoke the attention of the system 125. In the environment 100 of FIG. 1, the hotword 160 used to invoke the system 125's attention is the word "Google." Consequently, each time the word "Google" is spoken, it is picked up by one of the microphones 105, conveyed to the system 125, which performs speech recognition techniques to determine whether the hotword was spoken and, if so, awaits an ensuing command or query. Accordingly, utterances directed at the system 125 take the general form [HOTWORD] [QUERY], where "HOTWORD" in this example is "Google" and "QUERY" can be any question, command, declaration, or other request that can be speech recognized, parsed and acted on by the system 125, either alone or in conjunction with the server 155 via network 150.

In a multi-user, speech-enabled environment 100 such as shown in FIG. 1, in which any of multiple different users may be issuing a query or command (e.g., user 110 shown in FIG. 1 could be any of Mom, Dad, Matt or Kate), it may be important for the system 125 to know the identity of the user speaking any given utterance. For example, in FIG. 1, user 110 has made the utterance 120 "Google: When is my meeting with John?" To answer this query, the system 125 must access the speaker's online calendar and search it for an upcoming meeting in which the name "John" appears. But because the speaker of the utterance 120 may be any of at least four different users (Mom, Dad, Matt, Kate, or even someone else entirely), the system 125 cannot know, without more information, which user's online calendar to access. Consequently, the system 125 first must determine the identity of the speaker and, once that has been discerned, can then access that user's personal resources, such as his or her online calendar, to respond to the query. To do so, the system 125 uses the hotword 160 for a dual purpose, that is, not only to determine when it (the system 125) is being addressed but also to determine, by way of voice recognition (also known as speaker recognition and/or speaker identification), the identity of the hotword speaker. Put another way, the hotword is used both as a trigger that informs the system that it should process a received utterance and as a fixed word for purposes of speaker identification. In general, performing speaker identification on a fixed word tends to be a much simpler problem, computationally speaking, than recognition based on free form speech (that is, in comparison to text independent voice recognition).

More specifically, in conjunction with determining that the hotword "Google" has been uttered by someone (which informs the system 125 that it is being addressed), the system 125 also compares the spoken hotword with stored, previously uttered instances of the hotword by each of the users in the multi-user environment 100. That is, each of Mom, Dad, Matt and Kate had previously gone through a system recognition configuration session with the system 125 that involved, potentially among other things, uttering the hotword "Google" into a microphone 105 and providing other information (e.g., an identification declaration such as "this is Matt") sufficient for the system 125 to associate each user's hotword utterance with their respective usernames and thus their respective accounts. Following that configuration session, each time one of the users in the environment 100 utters the hotword "Google," the system 125 can quickly and easily recognize the identity of the speaker by performing speaker identification solely based on the hotword, which makes the performing speaker identification analysis significantly easier. In other words, rather than performing speaker identification on any arbitrary utterance or portion thereof, which tends to be analytically and computationally much more difficult and less reliable, the system 125 always performs speaker identification on the same word—namely, the chosen hotword—which has already been sampled and stored for each user and associated with a corresponding user account.

Figure 2:
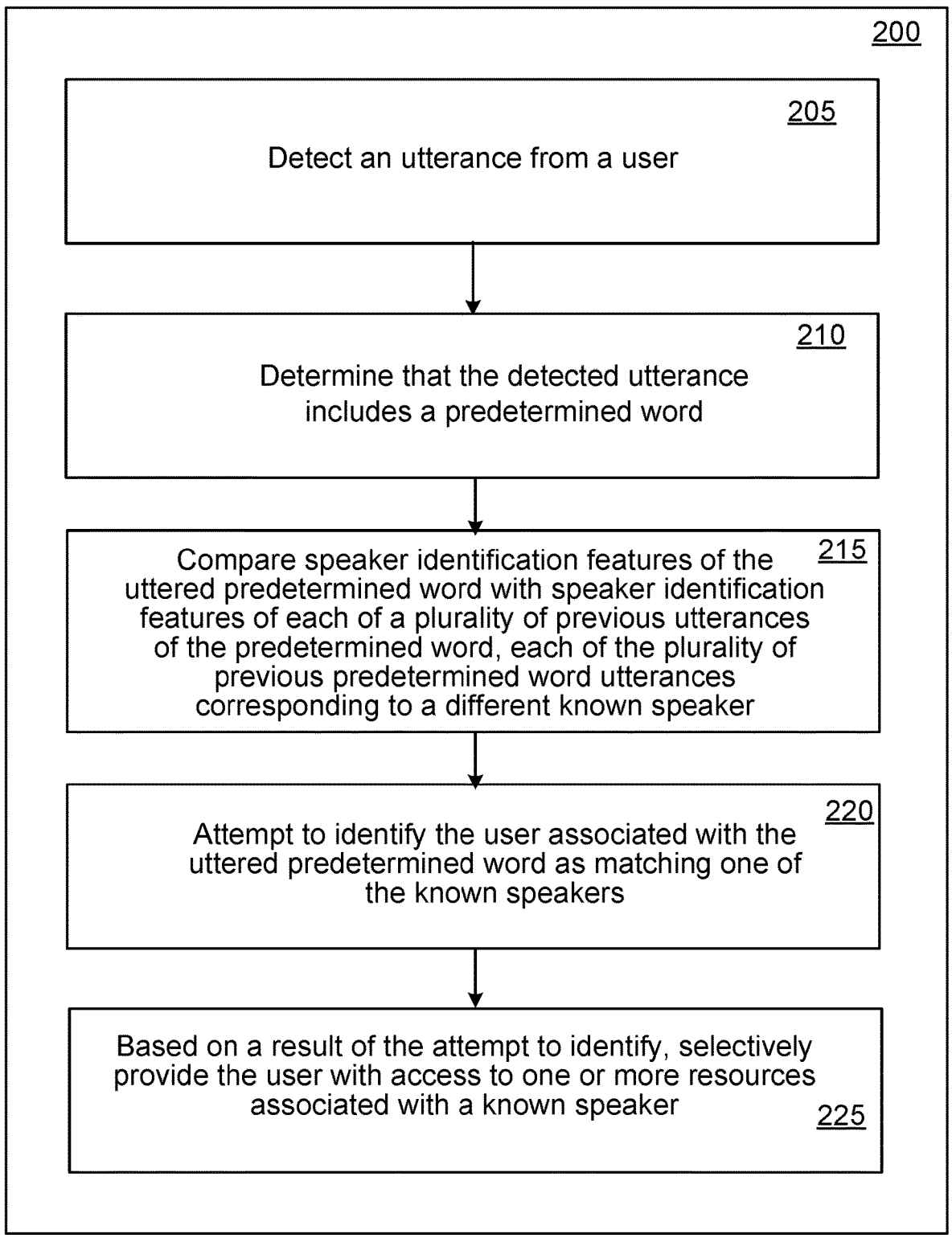
FIG. 2 is a flowchart showing an example of a process for recognizing a user based on a spoken hotword.

FIG. 2 is a flowchart showing an example of a process 200 for recognizing a user's identity based on a spoken predetermined word (e.g., a hotword) and then selectively providing the user with his or her associated resources (e.g., calendar, email, social networks, personal information, applications, etc.). In the context of FIG. 1, the process 200 can be performed in whole or part at the local system 125 or at the network-based server 155 or distributed among those locations.

At 205, the process detects an utterance from a user, for example, "Google: When is my meeting with John?" At 210, the process 200 determines (e.g., using speech recognition) that the received utterance includes a predetermined word (e.g., a hotword, in this example "Google").

At 215, the process 200 compares speaker identification features (e.g., standard Mel-Frequency Cestrum Coefficient ("MFCC") features, which collectively can form a feature vector) of the uttered predetermined word with speaker identification features of each of a plurality of previous utterances of the predetermined word. In an implementation, each of the previous predetermined word utterances corresponds to a different known speaker (e.g., known to, and having a corresponding username and account on, the system 125 in FIG. 1). Alternatively, a system can collect and maintain (and use in the speaker recognition evaluation) two or more instances of utterances of the predetermined word for each known speaker. Generally speaking, a speaker identification process that has available multiple examples of the target predetermined word (against which to compare the current, uttered word) tends to be more accurate and robust.

At 220, the process 200 attempts to identify the user that uttered the predetermined word based on whether or not the speaker identification features of the uttered predetermined word sufficiently match the speaker identification features of one of the previous utterances of the predetermined word. For example, the process 200 can extract the MFCCs from the uttered predetermined word, compute an average MFCC and then perform a nearest neighbor analysis between the average MFCC of the uttered predetermined word with each of the plurality of previous utterances of the predetermined word. The nearest previous predetermined word utterance, provided it is within a threshold maximum allowed distance, is determined to match the uttered predetermined word.

At 225, based on a result of the attempt to identify the user associated with the utterance, the process 200 selectively provides the user that made the utterance with access to one or more resources associated with the matched known speaker. For example, if the process 200 determined that the speaker identification features of the user's "Google" utterance sufficiently matched those of a previous utterance of the word "Google" by, say, Matt, then the process 200 would decide that the user that uttered the word "Google" at 205 was the user with the username "Matt" and thus would grant that user access to the universe of resources associated with Matt's account 140 registered on the system 125. As a result, whatever command or query happened to follow Matt's utterance of the hotword "Google" would be handled based on the context that the speaker is Matt and that Matt's personal information and other account resources represent the relevant body of information.

Optionally, if at 220 the hotword was not successfully speaker-identified (and assuming that the associated query requires personal information or other user-specific resources to satisfy), the process 200 can challenge the user for his or her identity, e.g., by asking who has spoken the utterance detected at 205. The process 200 can then use speech recognition to analyze the user's response (e.g., "this is Matt") to determine that the user is Matt and subsequently fulfill the query using Matt's personal information or other user-specific resources.

Figure 3:
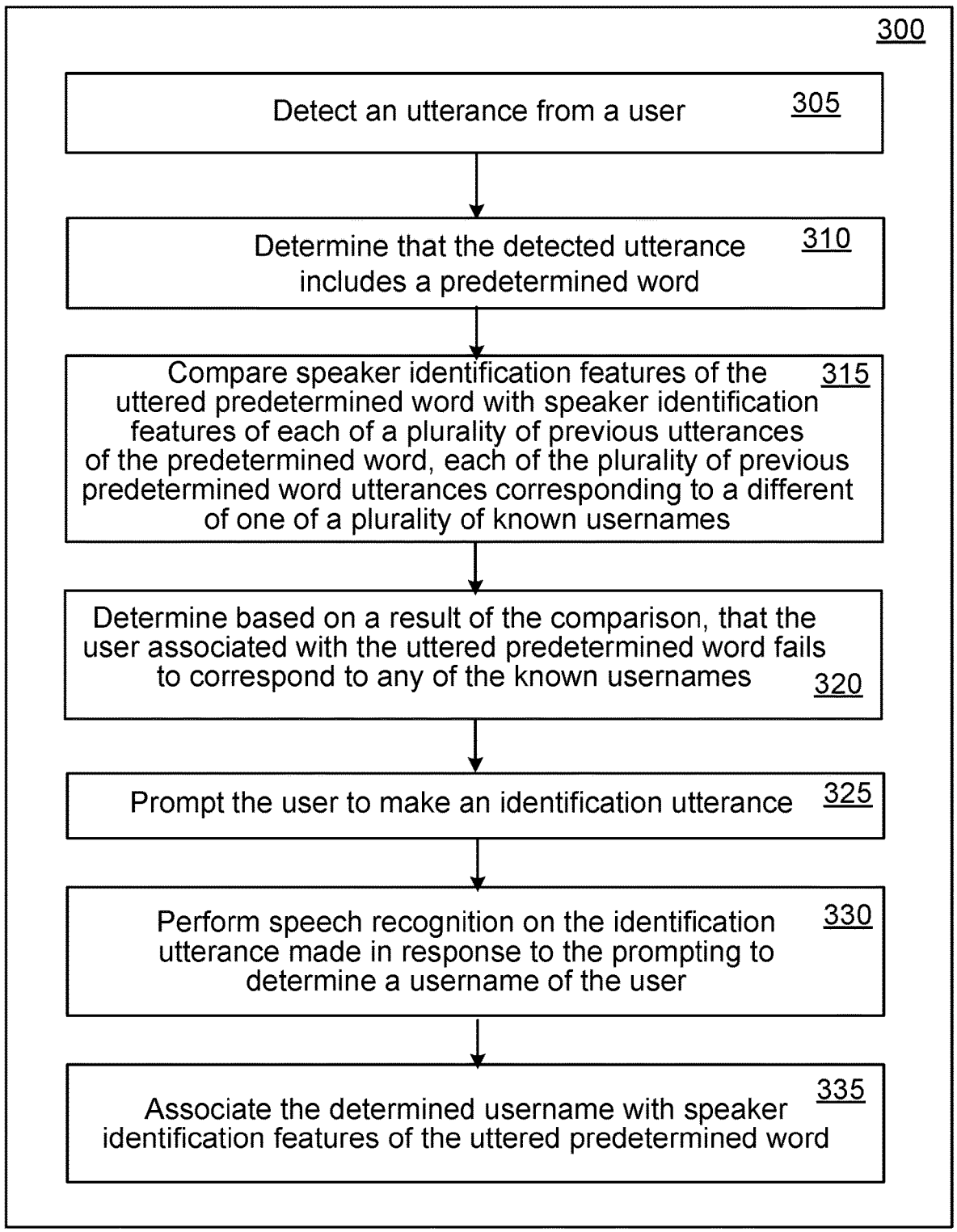
FIG. 3 is a flowchart showing an example of a process for associating a spoken hotword with a particular user.

FIG. 3 is a flowchart showing an example of a process 300 for associating a spoken hotword with a particular user. The process 300 would be performed, for example, when the system is unable to recognize the speaker of the hotword in the first instance. As with process 200, the process 300 can be performed in whole or part at the local system 125 or at the network-based server 155 or distributed among those locations.

At 305, the process 300 detects an utterance from a user, for example, "Google: When is my meeting with John?" At 310, the process 300 determines (e.g., using speech recognition) that the received utterance includes a predetermined word (e.g., a hotword, in this example "Google"). At 315, the process 300 compares speaker identification features of the uttered predetermined word with speaker identification features of each of a plurality of previous predetermined word utterances, each which corresponds to a different known username, each of which in turn corresponds to a known speaker.

At 320, the process 300 determines, based on a result of the comparison in 315 that the user associated with the uttered predetermined word fails to correspond to any of the known usernames. This situation could happen, for example, if the system receiving and analyzing the utterance is new or has been reconfigured or if ambient noise or the like interferes with the voice recognition of the uttered predetermined word. As a result of the failure to identify the user, at 325 the process 325 prompts the user to make an identification utterance (e.g., using synthesized voice output the system states "who are you?" or "state your name"). At 330, the process 300 performs speech recognition on the identification utterance made in response to the prompting to determine a username of the user. For example, if in response to the prompting at 325 the user responded "this is Matt" or simply "Matt," the process 300 could determine that the word "Matt" was spoken by the user and assume that the user had just spoken his username. At 335, the process 300 associates the determined username, and thus the corresponding user account, with speaker identification features of the uttered predetermined word. For example, if based on the user's identification utterance the user's username is determined to be "Matt," the system associates the username "Matt," and thus the registered user account associated with the username Matt, with speaker identification features of predetermined word (e.g., "Google") that was detected at 305. Going forward, the system will then be able to identify Matt when he speaks the hotword and, in response, give him access to his account and its related resources.

Figure 4:
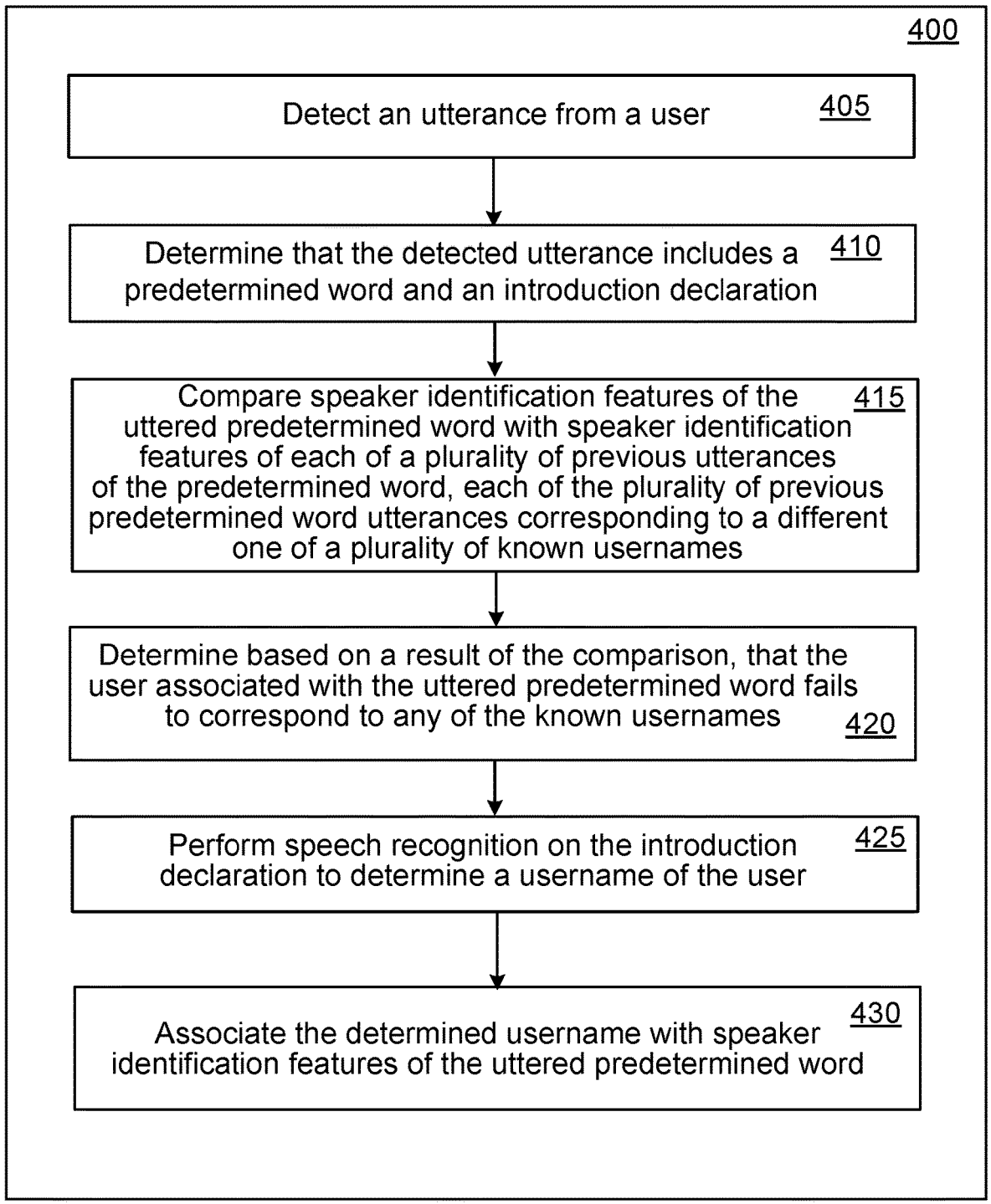
FIG. 4 is a flowchart showing an example of a process for associating a spoken hotword with a particular user.

FIG. 4 is a flowchart showing an example of a process for associating a spoken hotword with a particular user. The process 400, for example, would be performed during an initial user recognition configuration session, the purpose of which is to associate the identity of a speaker of a spoken hotword with a particular user account registered with the system (either locally or remotely or both). As with processes 200 and 300, the process 400 can be performed in whole or part at the local system 125 or at the network-based server 155 or distributed among those locations.

At 405, the process 400 detects an utterance from a user, for example, an introduction query such as "Google: this is Matt." At 410, the process 400 determines (e.g., using speech recognition) that the received utterance includes a predetermined word (e.g., a hotword, in this example "Google") followed by an introduction declaration (e.g., "this is Matt"). At 415, the process 400 compares speaker identification features of the uttered predetermined word with speaker identification features of each of a plurality of previous predetermined word utterances, each which corresponds to a different known username, each of which in turn corresponds to a known speaker. At 420, the process 400 determines, based on a result of the comparison in 415 that the user associated with the uttered predetermined word fails to correspond to any of the known usernames.

At 425, the process 400 performs speech recognition on the introduction declaration (e.g., "this is Matt") to determine a username of the user (e.g., "Matt"). At 430, the process 300 associates the determined username, and thus the corresponding user account, with speaker identification features of the uttered predetermined word. For example, if based on the user's identification utterance the user's username is determined to be "Matt," the system associates the username "Matt," and thus the registered user account associated with the username Matt, with speaker identification features of predetermined word (e.g., "Google") that was detected at 405. Going forward, the system will then be able to identify Matt when he speaks the hotword and, in response, give him access to his account and its related resources.

Variations on the techniques described above may be implemented. For example, essentially any appropriate hotword may be used as desired and the format of the utterances to the system need not necessarily conform to the format [HOTWORD] [QUERY]. Potentially, the hotword may occur at any location within the utterance. In addition, to enhance system security, the system could implement a verification step to further confirm the speaker's identity (that is, in addition to performing voice recognition on the spoken hotword). For example, the system could ask the user for something like the name of a person to whom an email was sent from the purported user's account within the past 24 hours. Moreover, recognition of the hotword and recognition of the speaker's identity can be performed independently of each other and potentially at different locations (e.g., the hotword can be recognized at the local system and the speaker can be recognized at a remote server or vice versa). Similarly, fulfillment of the query or command can be performed at the local system or at a remote server or a combination of the two.

Figure 5:
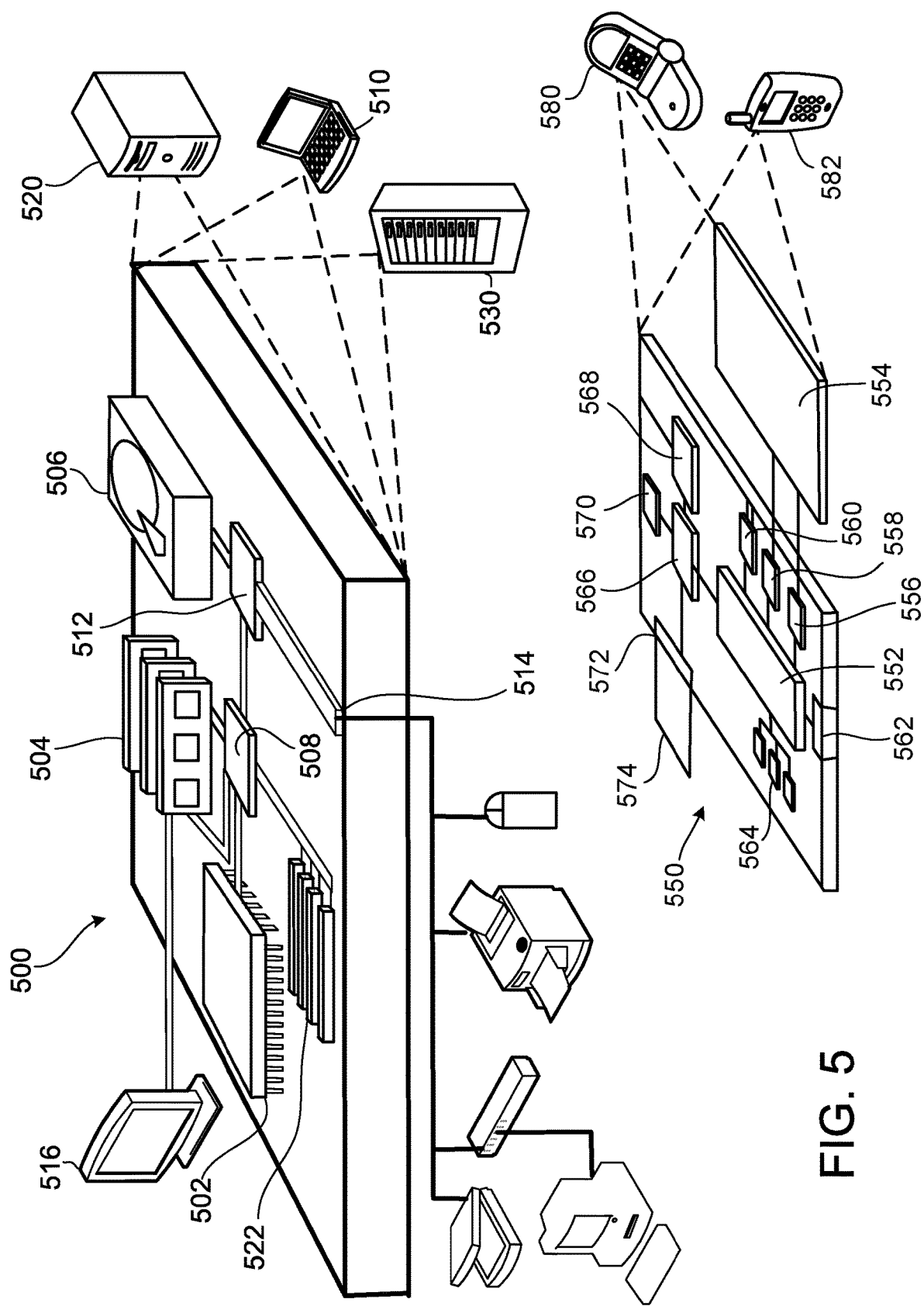
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
    during a user recognition configuration session for each of a plurality of different users in a multi-user environment:
        storing, on a voice-based authentication device having access to an associated set of personal resources for each of the plurality of different users in the multi-user environment, audio features of a hotword spoken by the corresponding user in one or more user-identification utterances, the hotword comprising a predetermined fixed term that is common to each of the plurality of different users in the multi-user environment; and
        associating, by the voice-based authentication device, the audio features of the hotword spoken by the corresponding user with the associated set of personal resources for the corresponding user;
    receiving, at the voice-based authentication device, a first utterance spoken by one of the plurality of different users in the multi-user environment, the first utterance comprising the hotword and a query, the query requesting an operation for the voice-based authentication device to perform for the one of the plurality of different users that spoke the first utterance;
    after receiving the first utterance, establishing, by the voice-based authentication device, an identity of the user that spoke the first utterance based on audio features of a portion of the first utterance that corresponds to the hotword;
    in response to establishing the identity of the user that spoke the first utterance, invoking, by the voice-based authentication device, an automated speech recognizer to process the query following the hotword in the first utterance to identify:
        the operation for the voice-based authentication device to perform; and
        one of the personal resources of the associated set of personal resources for the user that spoke the first utterance associated with the query and that requires access by the voice-based authentication device to perform the operation; and
    accessing, by the voice-based authentication device, the required one of the personal resources of the associated set of personal resources for the user that spoke the first utterance to perform the identified operation, the personal resource unique to the user that spoke the first utterance.

2. The method of claim 1, wherein the hotword when spoken in an utterance by any of the plurality of different users, triggers the voice-based authentication device toperform speaker identification to identify which user of the plurality of different users spoke the utterance based solely on the hotword.

3. The method of claim 1, further comprising, during the user recognition configuration session:
    receiving, by the voice-based authentication device, a corresponding username for each of the plurality of different users in the multi-user environment; and
    associating, by the voice-based authentication device, each corresponding username with the audio features of the hotword spoken by the corresponding user in the one or more user-identification utterances.

4. The method of claim 3, wherein:
    establishing the identity of the user that spoke the first utterance comprises determining the corresponding username of the user that spoke the first utterance; and
    accessing the required one of the personal resources comprises accessing the required one of the personal resources from the associated set of personal resources for the user that spoke the first utterance based on the corresponding username of the user that spoke the first utterance.

5. The method of claim 1, wherein establishing the identity of the user that spoke the first utterance comprises:
    comparing the audio features of the portion of the first utterance that corresponds to the hotword to the stored audio features of the hotword spoken by each of the plurality of different users during the user recognition configuration session; and
    determining, based at least on comparing the audio features of the portion of the first utterance that corresponds to the hotword to the stored audio features of the hotword spoken by each of the plurality of different users, that the audio features of the portion of the first utterance that corresponds to the hotword match one of stored audio features of the hotword spoken by one of the users during the user recognition configuration session.

6. The method of claim 1, wherein the audio features comprise Mel-Frequency Cestrum Coefficient (MFCC) features.

7. The method of claim 1, wherein the associated set of personal resources for each of the plurality of different users in the multi-user environment comprise at least one of a contact list, calendar, email, voicemail, social networks, biographical information, or financial information.

8. The method of claim 1, wherein at least one personal resource of the associated set of personal resources is distributed across one or more server computer systems in communication with the voice-based authentication device.

9. The method of claim 1, further comprising providing, by the voice-based authentication device, a response to the query in the first utterance based on performing the identified operation.

10. The method of claim 9, wherein providing the response to the query comprises:
   obtaining, by the voice-based authentication device, a transcription of a portion of the first utterance that corresponds to the query;
   accessing, by the voice-based authentication device and based at least on the transcription of the portion of the first utterance that corresponds to the query, data from the required one of the personal resources of the associated set of personal resources for the user that spoke the first utterance; and
   providing, for output by the voice-based authentication device, the data accessed from the required one of the personal resources.

11. A system comprising:
   data processing hardware of a voice-based authentication device, the voice-based authentication device having access to an associated set of personal resources for each of a plurality of different users in a multi-user environment; and
   memory hardware in communication with the data processing hardware and storing instructions that when executed on the data processing hardware cause the data processing hardware to perform operations comprising:
      during a user recognition configuration session for each of the plurality of different users in the multi-user environment:
         storing, on the voice-based authentication device, audio features of a hotword spoken by the corresponding user in one or more user-identification utterances, the hotword comprising a predetermined fixed term that is common to each of the plurality of different users in the multi-user environment; and
         associating the audio features of the hotword spoken by the corresponding user with the associated set of personal resources for the corresponding user;
      receiving a first utterance spoken by one of the plurality of different users in the multi-user environment, the first utterance comprising the hotword and a query, the query requesting an operation for the voice based authentication device to perform for the one of the plurality of different users that spoke the first utterance;
      after receiving the first utterance, establishing an identity of the user that spoke the first utterance based on audio features of a portion of the first utterance that corresponds to the hotword;
      in response to establishing the identity of the user that spoke the first utterance, invoking an automated speech recognizer to process the query following the hotword in the first utterance to identify:
         the operation for the voice-based authentication device to perform; and
         one of the personal resources of the associated set of personal resources for the user that spoke the first utterance associated with the query and that requires access by the voice-based authentication device to perform the operation; and
      accessing the required one of the personal resources of the associated set of personal resources for the user that spoke the first utterance to perform the identified operation, the personal resource unique to the user that spoke the first utterance.

12. The system of claim 11, wherein the hotword when spoken in an utterance by any of the plurality of different users, triggers the voice-based authentication device toperform speaker identification to identify which user of the plurality of different users spoke the utterance based solely on the hotword.

13. The system of claim 11, wherein the operations further comprise, during the user recognition configuration session:
   receiving a corresponding username for each of the plurality of different users in the multi-user environment; and
   associating each corresponding username with the audio features of the hotword spoken by the corresponding user in the one or more user-identification utterances.

14. The system of claim 13, wherein:
   establishing the identity of the user that spoke the first utterance comprises determining the corresponding username of the user that spoke the first utterance; and
   accessing the required one of the personal resources comprises accessing the required one of the personal resources from the associated set of personal resources for the user that spoke the first utterance based on the corresponding username of the user that spoke the first utterance.

15. The system of claim 11, wherein establishing the identity of the user that spoke the first utterance comprises:
   comparing the audio features of the portion of the first utterance that corresponds to the hotword to the stored audio features of the hotword spoken by each of the plurality of different users during the user recognition configuration session; and
   determining, based at least on comparing the audio features of the portion of the first utterance that corresponds to the hotword to the stored audio features of the hotword spoken by each of the plurality of different users, that the audio features of the portion of the first utterance that corresponds to the hotword match one of stored audio features of the hotword spoken by one of the users during the user recognition configuration session.

16. The system of claim 11, wherein the audio features comprise Mel-Frequency Cestrum Coefficient (MFCC) features.

17. The system of claim 11, wherein the associated set of personal resources for each of the plurality of different users in the multi-user environment comprise at least one of a contact list, calendar, email, voicemail, social networks, biographical information, or financial information.

18. The system of claim 11, wherein at least one personal resource of the associated set of personal resources is distributed across one or more server computer systems in communication with the voice-based authentication device.

19. The system of claim 11, wherein the operations further comprise providing a response to the query in the first utterance based on performing the identified operation.

20. The system of claim 19, wherein providing the response to the query comprises:
- obtaining a transcription of a portion of the first utterance that corresponds to the query;
- accessing, based at least on the transcription of the portion of the first utterance that corresponds to the query, data from the required one of the personal resources of the associated set of personal resources for the user that spoke the first utterance; and
- providing, for output by the voice-based authentication device, the data accessed from the required one of the personal resources.

* * * * *